US009446805B2

(12) United States Patent
Ellmann

(10) Patent No.: US 9,446,805 B2
(45) Date of Patent: Sep. 20, 2016

(54) TRACK ASSEMBLY HAVING ARCUATE CRAWLER SHOES

(71) Applicant: Caterpillar Inc., Peoria, IL (US)

(72) Inventor: Thomas Ellmann, Creve Coeur, IL (US)

(73) Assignee: Caterpillar Inc., Peoria, IL (US)

( * ) Notice: Subject to any disclaimer, the term of this patent is extended or adjusted under 35 U.S.C. 154(b) by 105 days.

(21) Appl. No.: 14/465,237

(22) Filed: Aug. 21, 2014

(65) Prior Publication Data

US 2016/0052571 A1 Feb. 25, 2016

(51) Int. Cl.
*B62D 55/14* (2006.01)
*B62D 55/20* (2006.01)
*B62D 55/21* (2006.01)
*B62D 55/125* (2006.01)

(52) U.S. Cl.
CPC .......... *B62D 55/202* (2013.01); *B62D 55/125* (2013.01); *B62D 55/14* (2013.01); *B62D 55/21* (2013.01); *B62D 55/211* (2013.01)

(58) Field of Classification Search
CPC  B62D 55/14; B62D 55/145; B62D 55/0966; B62D 55/20; B62D 55/202; B62D 55/21; B62D 55/211; B62D 55/28
See application file for complete search history.

(56) References Cited

U.S. PATENT DOCUMENTS

| 3,916,708 A | 11/1975 | Durand |
| 4,278,301 A | 7/1981 | Gregor et al. |
| 4,423,910 A | 1/1984 | Narang |
| 4,602,825 A * | 7/1986 | Meisel, Jr. ........... B62D 55/286 305/100 |
| 5,096,270 A * | 3/1992 | Oilund ............... B62D 55/0845 180/6.7 |
| 5,853,233 A * | 12/1998 | Turner .................. B62D 55/28 305/123 |
| 6,634,725 B2 * | 10/2003 | Sugiyama ............ B62D 55/211 305/101 |
| 7,210,750 B2 * | 5/2007 | Yamamoto ......... B62D 55/0882 305/107 |
| 8,070,240 B2 | 12/2011 | Zheng et al. |
| 8,070,241 B2 | 12/2011 | Mulligan |
| 2010/0156170 A1 | 6/2010 | Zheng et al. |
| 2014/0001824 A1 | 1/2014 | Meyer et al. |
| 2014/0083782 A1 | 3/2014 | Brewer et al. |

FOREIGN PATENT DOCUMENTS

EP    2636579    9/2013

OTHER PUBLICATIONS

U.S. Patent Application to Ellmann entitled "Track Assembly Having Dual-Sprocket Drive Wheel" filed on Aug. 21, 2014.

* cited by examiner

*Primary Examiner* — John Walters
*Assistant Examiner* — James Triggs
(74) *Attorney, Agent, or Firm* — Finnegan, Henderson, Farabow, Garrett & Dunner, LLP

(57) ABSTRACT

A crawler shoe is disclosed for use with a mobile machine having a track assembly with a sprocket. The crawler shoe may have a ground engaging surface, and laterally spaced-apart links connected at a side opposite the ground engaging surface. The laterally spaced-apart links may each have an arcuate wear surface configured to provide hub support against bearing forces of the sprocket, and at least one bore configured to receive a pin that transfers tractive forces from the sprocket to the plate.

17 Claims, 4 Drawing Sheets

TRACK ASSEMBLY HAVING ARCUATE CRAWLER SHOES

TECHNICAL FIELD

The present disclosure relates generally to a track assembly and, more particularly, to a track assembly having arcuate crawler shoes.

BACKGROUND

A track-type mobile machine utilizes tracks located at either side of the machine to propel the machine. The tracks each include a chain having links pinned end-to-end to form a loop that extends around a drive sprocket and one or more idler wheels, and ground engaging pads connected to each pair of links in the chain. A ground engaging pad, together with a pair of links, is commonly referred to as a crawler shoe. In some embodiments, the crawler shoe is a single cast and/or forged component. Two sprockets are driven by an engine of the machine to rotate the chains of the two tracks and push the crawler shoes against a work surface, thereby transmitting torque from the engine to the surface in opposition to a desired travel direction of the machine. An example of this type of machine is disclosed in U.S. Pat. No. 8,070,240 of Zheng et al. that issued on Dec. 6, 2011.

In conventional track assemblies, planar wear surfaces of the chain links engage round surfaces of the drive wheel, the idler wheel, and/or the rollers, and slide over the round surfaces as the track assemblies are driven. Over time, the sliding motion of the planar surfaces on the round surfaces creates flat spots within the round surfaces. And each time the flat spots are encountered by the track assemblies, shock loading of the track assemblies can occur resulting in machine vibration. These vibrations, in some applications, can generate a significant amount of noise and/or cause discomfort for the operator.

The disclosed track assembly is directed to overcoming one or more of the problems set forth above.

SUMMARY

In one aspect, the present disclosure is related to a crawler shoe for a mobile machine having a track assembly with a sprocket. The crawler shoe may include a ground engaging surface, and laterally spaced-apart links connected at a side opposite the ground engaging surface. The laterally spaced-apart links may each have an arcuate wear surface configured to provide hub support against bearing forces of the sprocket, and at least one bore configured to receive a pin that transfers tractive forces from the sprocket to the ground engaging surface.

In another aspect, the present disclosure is related to a crawler shoe for a mobile machine having a track assembly with a sprocket. This crawler shoe may include a ground engaging surface, and laterally spaced-apart links connected at a side opposite the ground engaging surface. The laterally spaced-apart links may each have an arcuate first wear surface configured to provide hub support against bearing forces of the sprocket, and at least one bore configured to receive a pin that transfers tractive forces from the sprocket to the ground engaging surface. The laterally spaced-apart links may include two pairs of links, each having an inside link and an outside link. The inside and outside links of the two pairs of links may have the arcuate first wear surface, and the arcuate first wear surface of the inside and outside links of the two pairs of links may be aligned with each other along a common axis. Two outside links and a single inside link may be joined together by a single pin. The plate may include a second wear surface located between the two pairs of links, and the second wear surface may be curved about an axis that is substantially orthogonal to an axis of the first wear surface. The second wear surface may extend longitudinally a full length of the plate and laterally between the two pairs of links.

In yet another aspect, the present disclosure is related to a track assembly for a mobile machine. The track assembly may include a plurality of crawler shoes, each having a ground engaging surface and laterally spaced-apart links on a side opposite the ground engaging surface. The track assembly may also include a plurality of pins connecting the laterally spaced-apart links of each of the plurality of crawler shoes, and a drive wheel having a sprocket configured to engage the plurality of pins. Each of the laterally spaced-apart links may have an arcuate wear surface, and a hub of the drive wheel may be configured to ride on the arcuate wear surface.

DETAILED DESCRIPTION

Figure 1:
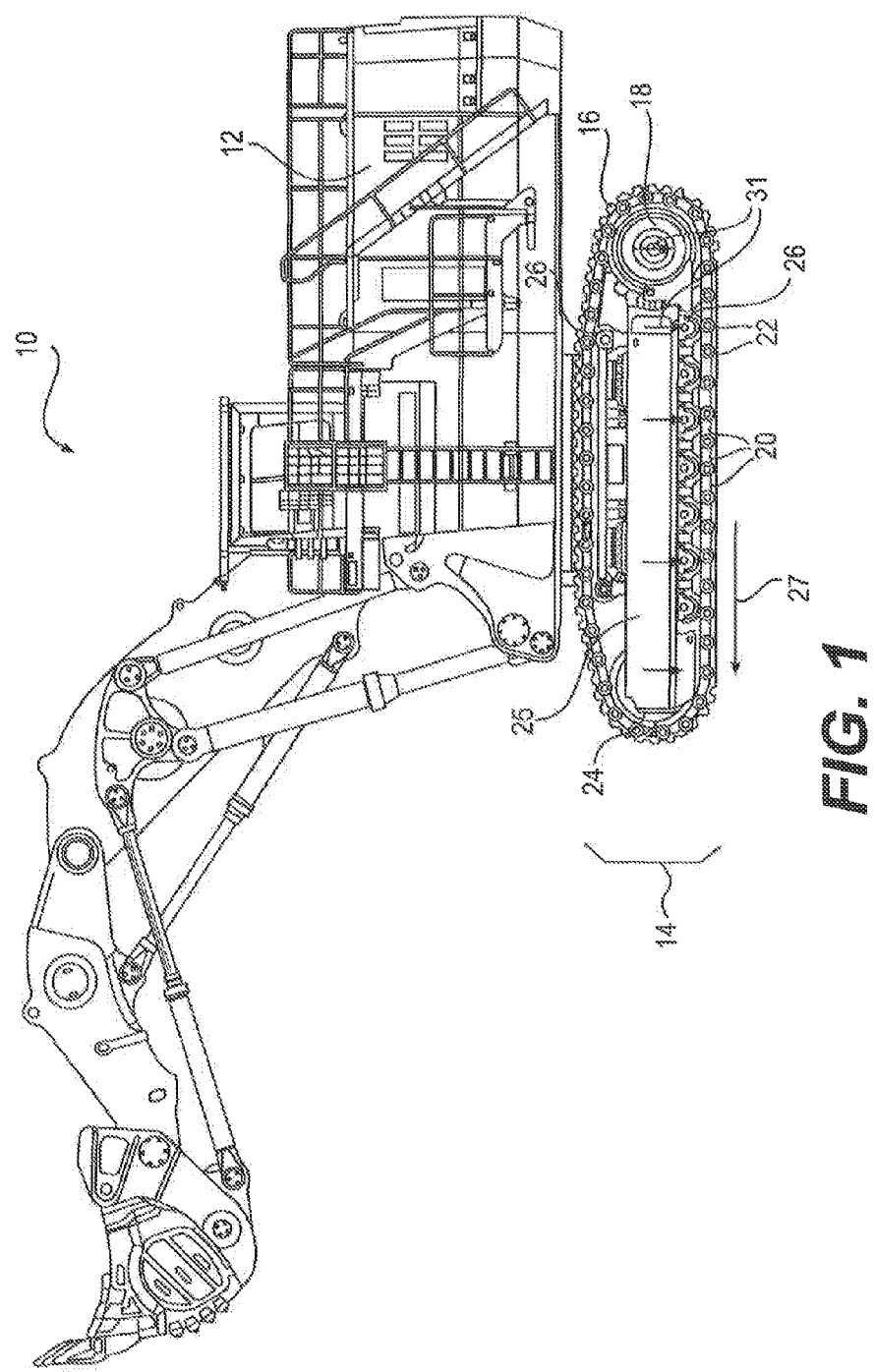
FIG. 1 is a side-view illustration of an exemplary disclosed mobile machine.

FIG. 1 illustrates a track type mobile machine 10 having an engine 12 supported by a frame and configured to drive a tracked undercarriage 14. Mobile machine 10 may be any machine that performs an operation associated with an industry such as mining, construction, farming, or another industry known in the art. For example, machine 10 may be a material moving machine such as a front shovel, a rope shovel, a hydraulic excavator, a dozer, a loader, or another material moving machine.

Undercarriage 14 may include parallel track assemblies 16 that are located at opposing sides of machine 10 and driven by engine 12 via corresponding drive wheels 18 (only one track assembly 16 and one drive wheel 18 are shown in FIG. 1). Each track assembly 16 may include a plurality of crawler shoes 20 connected end-to-end via pins 22 to form an endless loop. The endless loop of crawler shoes may be wrapped around corresponding drive wheels 18, one or more idler wheels 24, and at least one roller 26. Drive wheels 18 may engage pins 22 (or engage bushings that encase pins 22) of crawler shoes 20 and thereby transmit torque from engine 12 to track assemblies 16. Idler wheel 24 and rollers 26 may guide track assemblies 16 in a general elliptical trajectory around drive wheels 18. A tensioner 25 may be located between idler wheel 24 and drive wheel 18 to push these components apart and thereby maintain a desired tension of track assembly 16. Crawler shoes 20 may function to transmit the torque from drive wheels 18 as a driving linear (tractive) force 27 into a ground surface. The weight of machine 10 may be transmitted from drive wheel 18, idler wheel 24, and rollers 26 through crawler shoes 20 as a bearing force 31 into the ground surface.

Figure 2:
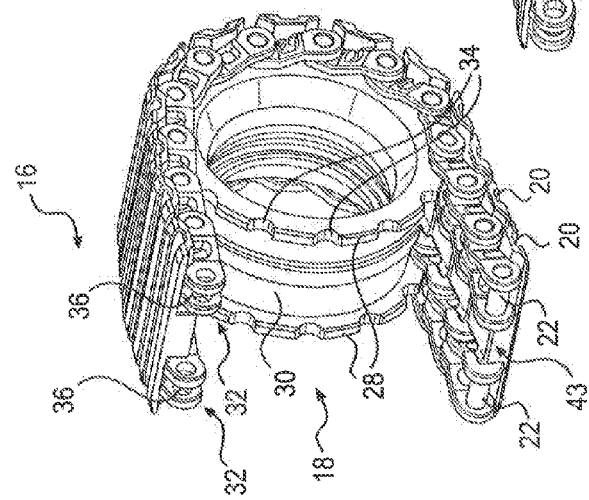

As shown in FIG. 2, each drive wheel 18 may include multiple (e.g., dual) sprockets 28 connected to each other by way of a hub 30. Sprocket 28 may be configured to separately engage a corresponding continuous chain 32 formed by crawler shoes 20 and thereby propel machine 10. Chains 32 may be located apart from each other at lateral edges of crawler shoes 20, and sprockets 28 may extend into longitudinal spaces 36 with each chain 32. A plurality of openings or pockets 34 formed around a periphery of each sprocket 28 may be configured to receive pins 22 of track assembly 16.

Figure 3:
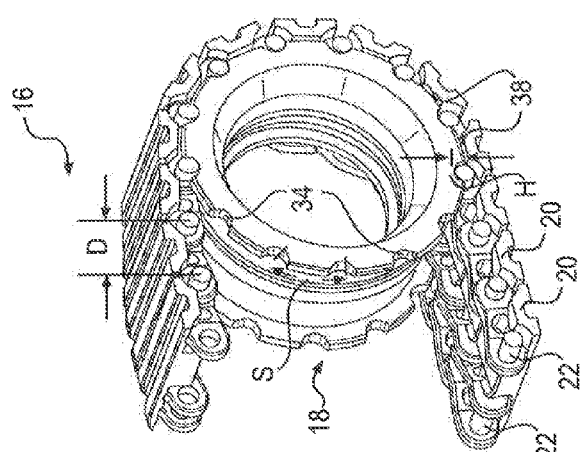
FIGS. 2-4 are isometric illustrations of an exemplary disclosed track assembly that may be used in conjunction with the mobile machine of FIG. 1.

In FIG. 3, an outside portion of track assembly 16 has been removed to illustrate a unique relationship between sprocket 28 and pins 22. As can be seen in this figure, pockets 34 may be elongated (i.e., have a width greater than a height) and configured to simultaneously engage and exert torque on all pins 22 that are received therein. That is, instead of a single tooth of a conventional drive wheel engaging a single conventional crawler shoe lug at a given time, sixteen different pins 22 are shown as being simultaneously engaged by the disclosed drive wheel 18. This may allow for an increased amount of torque to be transmitted through sprocket 28 to track assembly 16 and/or an increased component life of undercarriage 14. It should be noted that a different number of pins 22 may be simultaneously engaged by drive wheel 18, depending on the particular application.

A height H of each sprocket pocket 34 may be about equal to a radius of pin 22, and a pitch spacing S between adjacent pockets 34 may be about equal to a longitudinal distance D between pins 22. With this configuration, the tractive forces 27 transmitted from sprockets 28 to track assemblies 16 may be transmitted through a center of pins 22, and no empty pockets 34 may exist between engaged pins 22. This may allow for a greater amount of material to exist at the periphery of sprocket 28, and a corresponding greater strength of sprocket 28.

When pins 22 are engaged with pockets 34 of sprocket 28, a radial clearance 38 may exist between sprocket 28 and crawler shoes 20. In particular, the outer periphery of sprocket 28 may not ride directly on crawler shoes 20. With this configuration, the only forces being transmitted through sprocket 28 may be the forces passing into pins 22. And these forces may primarily be tractive forces 27. In other words, little or no bearing forces 31 may be transmitted from sprocket 28 into pins 22. This may result in an overall reduction in forces experienced by pins 22 and a corresponding increase in the life of pins 22.

Figure 4:
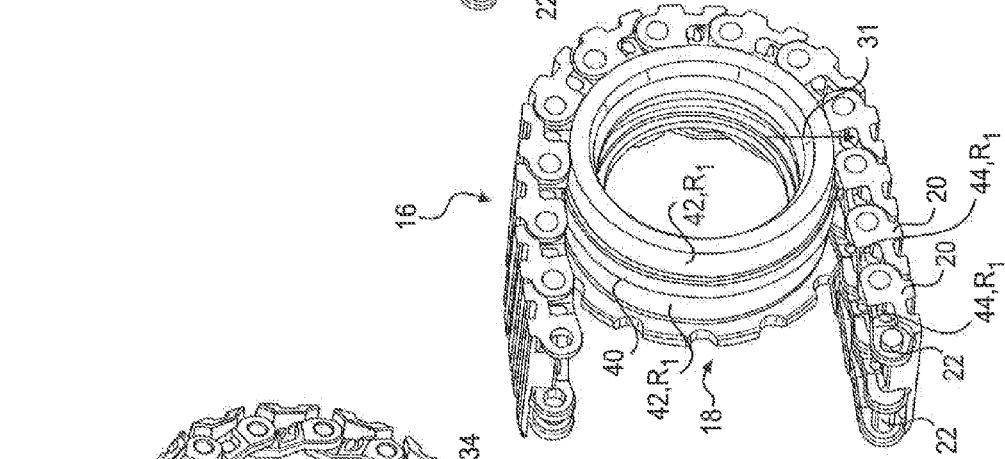

In FIG. 4, a greater amount of track assembly 16 has been removed to illustrate a unique relationship between crawler shoes 20 and hub 30 of drive wheel 18. As can be seen in this figure, the bearing forces 31 of machine 10 may primarily be supported by hub 30 on crawler shoes 20. Specifically, hub 30 may be generally cylindrical, having a center portion or rib 40 and opposing end portions or running surfaces 42 located axially outboard of center rib 40. And running surfaces 42 of hub 30 may be configured to ride directly on chains 32, thereby bypassing pins 22 and transmitting the bearing forces 31 of machine 10 directly onto crawler shoes 20. Center rib 40 may protrude radially outward a distance past running surfaces 42 and into a space 43 between chains 32. In this manner, center rib 40 (in addition to the location of sprockets 28 inside chains 32) may function to guide chains 32 (and thereby also track assembly 16 around drive wheel 18 (e.g., by periodically engaging and/or sliding against inboard surfaces of chains 32). Center rib 40 may not ride on crawler shoes 20 or transfer bearing forces 31 thereto.

As also shown in FIG. 4, each link of chains 32 may have an arcuate wear surface 44 with a radius $R_1$ generally matching a radius of hub 30 at running surfaces 42. In particular, when track assembly 16 is wrapped around drive wheel 18, the inside of chains 32 at wear surfaces 44 may form a substantially continuous round annulus that matches an outer curvature of hub 30 (and also of idler wheel 24—referring to FIG. 1). In the disclosed embodiment, $R_1$ may be about 800-825 mm. This curvature match may provide improved bearing force support, while also reducing sliding of chains 32 on hub 30 and idler wheel 24. The reduction in sliding may cause less wear of hub 30, allowing hub 30 to maintain a desired roundness that reduces machine vibration and improves operator comfort.

Figure 5:
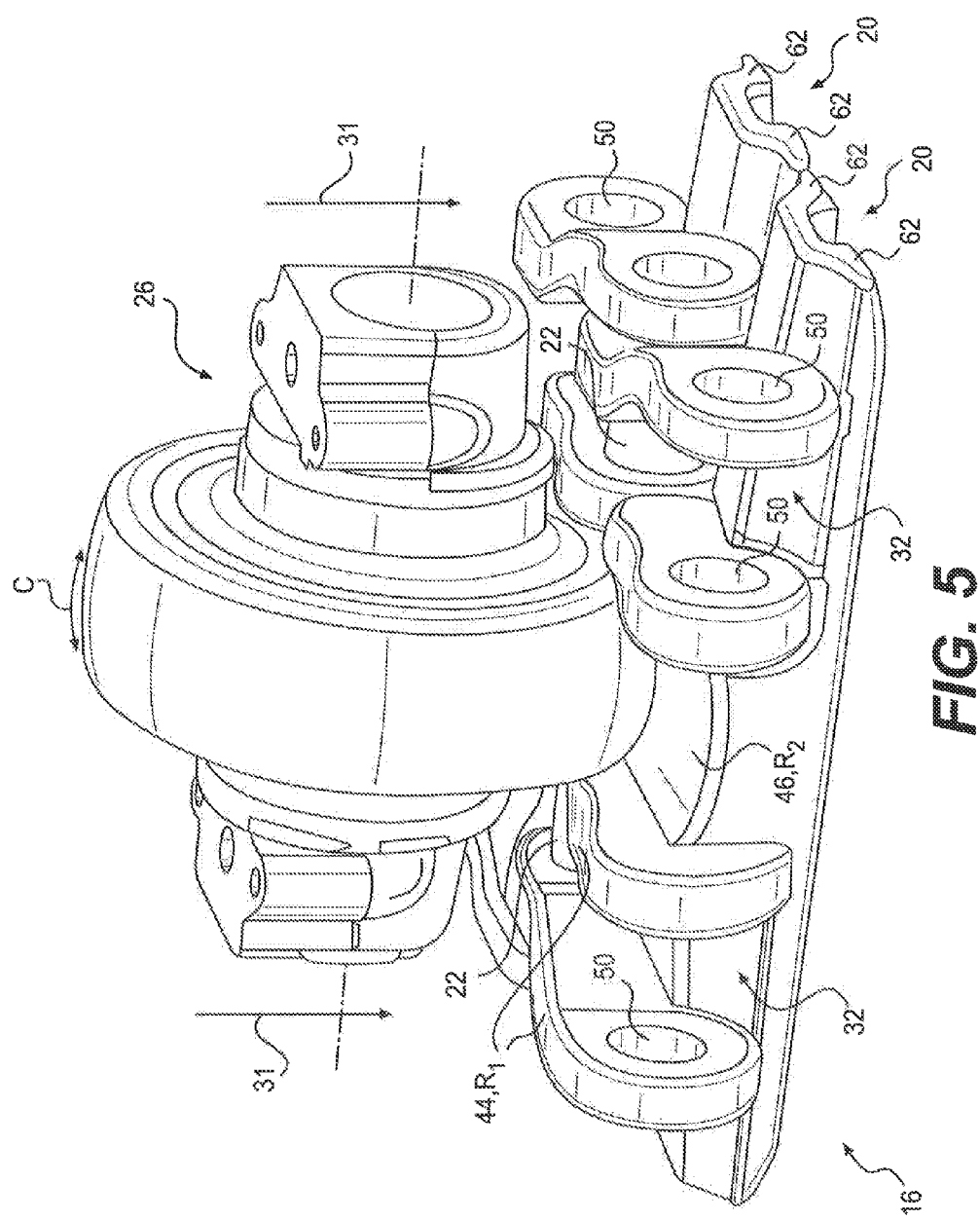
FIGS. 5-7 are isometric, plan, and front-view illustrations of an exemplary disclosed crawler shoe that forms a portion of the track assembly of FIGS. 2-4.

FIG. 5 illustrates a unique relationship between rollers 26 and track assembly 16. In addition to the bearing forces 31 of machine 10 passing through hub 30 and idler wheel 24 to crawler shoes 20, bearing forces 31 may also pass through rollers 26 to crawler shoes 20. In particular, rollers 26 may be configured to ride on a wear surface 46 that is located laterally between chains 32. As will be described in more detail below, wear surfaces 46 of all crawler shoes 20 within a particular track assembly 16 may form a substantially continuous smooth surface (i.e., a surface not having conventional lugs) upon which rollers 26 may ride. Rollers 26, like center rib 40 of hub 30, may also be configured to engage and/or slide against the inboard sides of chains 32, thereby helping to guide track assembly 16 in a desired trajectory around idler wheel 24 and drive wheel 18.

In some embodiments, roller 26 may have a transverse curvature C (i.e., a curvature in a direction aligned with a rotational axis of roller 26). In these embodiments, wear surface 46 may also be transversely curved to generally match the curvature of roller 26. For example, wear surface 46 may have a curvature $R_2$. In the disclosed embodiment, $R_2$ may be about $0.6-0.625 \times R_1$ (e.g., about equal to 500 mm). This curvature relationship may allow for a desired ratio of the bearing forces to be transmitted through idler wheel 24, rollers 26, and hub 30 of drive wheel 18.

Figure 6:
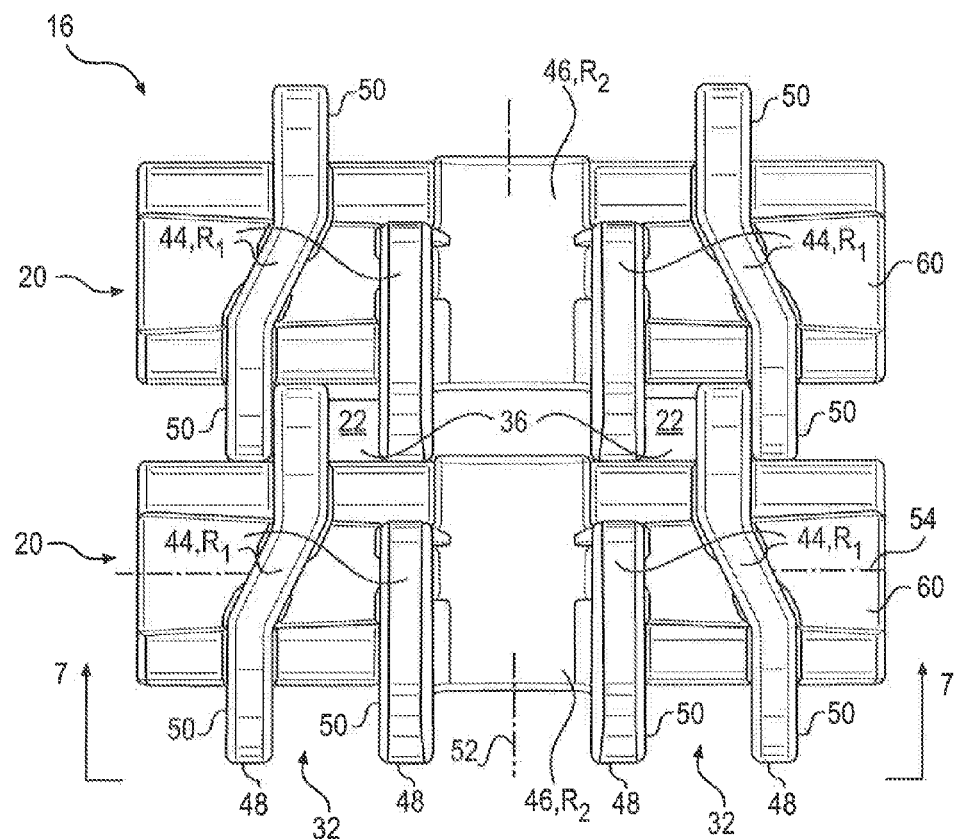
Figure 7:
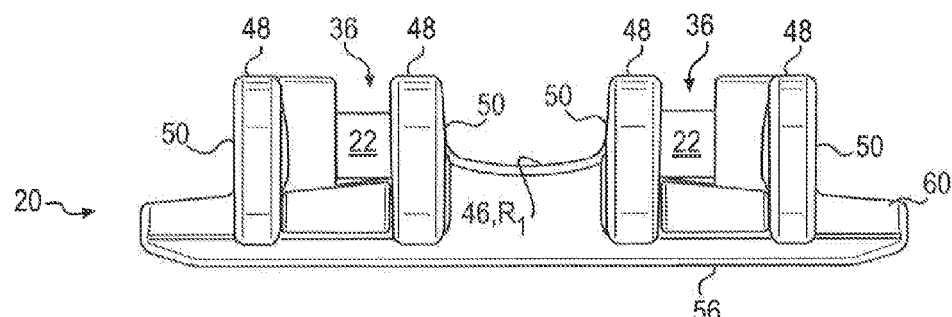

As shown in the plan and front views of FIGS. 6 and 7, each crawler shoe 20 may include two pairs of spaced-apart links 48 that are generally parallel with each other. Each link 48 may extend in a length direction of the associated chain 32, and include at least one pin bore 50 formed at an end thereof. In the embodiment of FIGS. 5-7, an inside link 48 of each pair includes only a single pin bore 50 located at a leading end, while the paired outside link 48 includes two pin bores 50 (one located at each end). In this configuration, a trailing end of only the outside link 48 is configured to pass between paired links 48 at the leading end of an adjacent crawler shoe 20, such that three corresponding pin bores 50 align. Pins 22 may then pass through the three aligned bores 50, thereby joining the adjacent crawler shoes 20. It is contemplated, however, that both links 48 (i.e., the inside link 48 and the outside link 48) of each pair could have two pin bores 50 (shown in embodiment of FIGS. 2-4) and/or that that the trailing ends of both links 48 could connect with two corresponding links 48 of an adjacent crawler shoe 20 (i.e., that four pin bores 50 would align and be connected by a single pin 22), if desired. Other configurations may also be possible.

Each link 48 may include wear surface 44 configured to engage sprocket 28 and idler wheel 24. Wear surface 44 may be located at an edge opposite a ground engaging surface 56 of crawler shoe 20. The outer links 48 of each pair may have a transverse zigzag shape, while the inner links 48 may be generally planar. Other shapes may also be possible. Wear surfaces 44 of all links 48 within a single crawler shoe 20 may be generally aligned with each other (e.g., have a common axis 54).

A ground engaging pad 60 may be connected to links 48 opposite wear surface 44, to thereby rigidly connect links 48 to each other. Wear surface 46 may be formed within ground engaging pad 60 at a location between the pairs of links 48 (i.e., between chains 32). Specifically, wear surfaces 46 may be transversely centered within each crawler shoe 20, extend in the length direction about the same amount as ground engaging surface 56, and extend in the width direction from one pair of links 48 to the other pair of links. Wear surface 46 may be generally flat or straight in the length direction of track assembly 16, and be curved only around an axis 52 that is generally perpendicular to axis 54.

In the disclosed embodiment, ground engaging pad 60 and links 48 are integrally formed as a single cast and/or forged component. It is contemplated, however, that ground engaging pad 60 could initially be formed separately from links 48 and subsequently joined to links 48 via welding and/or threaded fastening, if desired. Ground engaging pad 60 may have any external geometry known in the art. For example, ground engaging pad 60 may be generally plate-like, include transverse ridges or grousers 62 (shown only in FIG. 5), have openings, and/or include any other features common in the art.

INDUSTRIAL APPLICABILITY

The track assembly of the present disclosure may be applicable to any track-type mobile machine. However, the disclosed track assembly may be particularly applicable to larger machines, in which the forces passing through the track assembly are significant and can affect longevity of the track assembly. This may be particularly important for expensive machines that operate around the clock, where downtime of the machine is costly to the owner.

The disclosed track assembly may have improved component longevity. Specifically, because bearing forces of the associated machine may pass primarily through a drive wheel hub to crawler shoes of the track assembly without passing through sprocket teeth or pins, the sprocket teeth and pins may experience less stress. And the reduction in stress may result in a longer life of these components. In addition, because the disclosed track assembly may utilize a dual-sprocket drive wheel, the tractive forces per tooth and per pin may be further reduced. Further, a strength of each sprocket may be increased through the use of additional material at a periphery thereof. And finally, because each sprocket may engage a center of each pin and because each pin may be supported at both ends, the bending moments acting on the pins may be lower.

The disclosed track assembly may also provide for enhanced machine operation. In particular, because the hub of the drive wheel may ride directly on arcuate wear surfaces of the track assembly links, the bearing forces of the machine may be more evenly distributed across the hub and the crawler shoes. In addition, the curved nature of the link wear surfaces may result in less sliding, which may help to maintain a roundness of the hub. And the roundness of the hub, in combination with improved force distribution, may result in lower track-induced vibration levels.

It will be apparent to those skilled in the art that various modifications and variations can be made to the disclosed track assembly. Other embodiments will be apparent to those skilled in the art from consideration of the specification and practice of the disclosed track assembly. It is intended that the specification and examples be considered as exemplary only, with a true scope being indicated by the following claims and their equivalents.

What is claimed is:

1. A crawler shoe for a mobile machine having a track assembly with a sprocket, the crawler shoe comprising:
   a ground engaging surface;
   laterally spaced-apart links connected at a side opposite the ground engaging surface, the laterally spaced-apart links each having:
      an arcuate wear surface configured to provide hub support against bearing forces of the sprocket; and
      at least one bore configured to receive a pin that transfers tractive forces from the sprocket to the ground engaging surface; and
   a second wear surface disposed between the laterally spaced-apart links wherein the second wear surface is curved about an axis that is substantially orthogonal to an axis of the arcuate wear surface.

2. The crawler shoe of claim 1, wherein:
   the laterally spaced-apart links includes two pairs of links, each of the two pairs of links having an inside link and an outside link; and
   both the inside and outside links of the two pairs of links have the arcuate wear surface.

3. The crawler shoe of claim 2, wherein the arcuate wear surface of the inside and outside links of the two pairs of links are aligned with each other along a common axis.

4. The crawler shoe of claim 2, wherein:
   the outside link as a zigzag shape; and
   the inside link is generally planar.

5. The crawler shoe of claim 4, wherein two outside links and a single inside link are joined together by a single pin.

6. The crawler shoe of claim 1, wherein a radius of curvature of the second wear surface is about 0.60-0.625×a radius of curvature of the arcuate wear surface.

7. The crawler shoe of claim 1, wherein the second wear surface extends longitudinally a full length of the crawler shoe and laterally between the laterally spaced-apart links.

8. The crawler shoe of claim 1, wherein:
   the track assembly further includes a plurality of rollers; and
   the second wear surface is configured to provide roller support against bearing forces.

9. A crawler shoe, for a mobile machine having a track assembly with a sprocket, the crawler shoe comprising:
   a ground engaging surface; and
   laterally spaced-apart links connected at a side opposite the ground engaging surface, the laterally spaced-apart links each having:
      an arcuate first wear surface configured to provide hub support against bearing forces of the sprocket; and
      at least one bore configured to receive a pin that transfers tractive forces from the sprocket to the ground engaging surface,
   wherein:
      the laterally spaced-apart links includes two pairs of links, each of the two pairs of links having an inside link and an outside link;
      both the inside and outside links of the two pairs of links have the arcuate first wear surface;
      the arcuate first wear surface of the inside and outside links of the two pairs of links are aligned with each other along a common axis;
      two outside links and a single inside link are joined together by a single pin;

the crawler shoe includes a second wear surface located between the two pairs of links;
the second wear surface is curved about an axis that is substantially orthogonal to an axis of the first wear surface;
the second wear surface extends longitudinally a full length of the crawler shoe and laterally between the two pairs of links.

10. A track assembly for a mobile machine, comprising:
a plurality of crawler shoes, each having a ground engaging surface and laterally spaced-apart links on a side opposite the ground engaging surface;
a plurality of pins connecting the laterally spaced-apart links of each of the plurality of crawler shoes; and
a drive wheel having a sprocket configured to engage the plurality of pins,
wherein:
each of the laterally spaced-apart links has an arcuate wear surface;
a hub of the drive wheel is configured to ride on the arcuate wear surface;
the laterally spaced-apart links includes two pairs of links, each of the two pairs of links having an inside link and an outside link; and
both the inside and outside links of the two pairs of links have the arcuate wear surface.

11. The track assembly of claim 10, wherein the arcuate wear surface of the inside and outside links of the two pairs of links are aligned with each other along a common axis.

12. The track assembly of claim 11, wherein two outside links and a single inside link are joined together by a single one of the plurality of pins.

13. The track assembly of claim 10, wherein:
the arcuate wear surface is a first wear surface; and
the each of the plurality of crawler shoes includes a second wear surface located between the two pairs of links.

14. The track assembly of claim 13, wherein the second wear surface is curved about an axis that is substantially orthogonal to an axis of the first wear surface.

15. The track assembly of claim 13, wherein a radius of curvature of the second wear surface is about 0.60-0.625×a radius of curvature of the first wear surface.

16. The track assembly of claim 13, wherein the second wear surface extends longitudinally a full length of the crawler shoe and laterally between the two pairs of links.

17. The track assembly of claim 13, further including:
an idler; and
a plurality of rollers located between the idler and the drive wheel,
wherein:
the idler is also configured to ride on the first wear surface; and
the plurality of rollers is configured to ride on the second wear surface.

* * * * *